E. K. BAKER.
PNEUMATIC TIRE MOUNTING.
APPLICATION FILED JULY 3, 1911.

1,095,777.

Patented May 5, 1914.
3 SHEETS—SHEET 2.

Witnesses:
Arthur W. Nelson
Edward F. Wilson

Inventor:
Erle K. Baker
by
[signature]
Atty.

E. K. BAKER.
PNEUMATIC TIRE MOUNTING.
APPLICATION FILED JULY 3, 1911.
1,095,777.
Patented May 5, 1914.
3 SHEETS—SHEET 3.
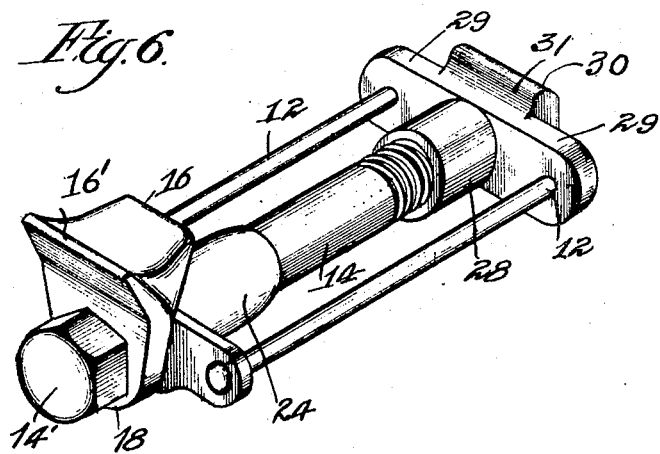
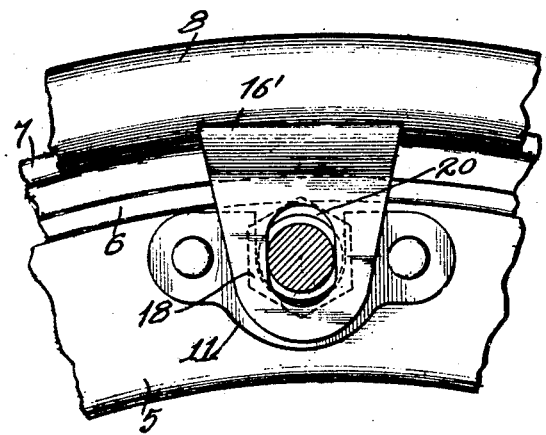
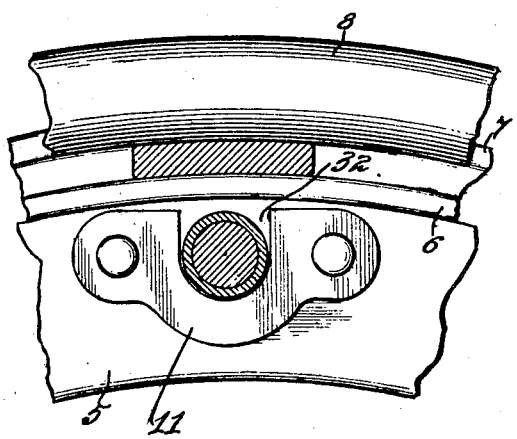

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

PNEUMATIC-TIRE MOUNTING.

1,095,777.   Specification of Letters Patent.   Patented May 5, 1914.

Continuation in part of application Serial No. 566,605, filed June 13, 1910. This application filed July 3, 1911. Serial No. 636,693.

*To all whom it may concern:*

Be it known that I, ERLE K. BAKER, a citizen of the United States, and a resident of Chicago, Cook county, Illinois, have invented certain new and useful Improvements in Pneumatic-Tire Mountings, of which the following is a full, true, clear, and exact description, such as will enable others skilled in the art to make and use the same.

My invention relates to improvements in automobile wheels having demountable rims, and the objects of my invention are to improve and simplify the construction of the wedging and clamping devices that are used for detachably or separably connecting such wheels and rims,—to strengthen such devices and make them more durable and reliable,— to extend and amplify their functions and operations,—to provide rim clamping wedge devices of such form and manner of operation as to markedly lessen the time required to mount and demount an automobile wheel rim,—make them permanent parts of the wheel structure so that though movable within limits for the removal and replacement of the rim they nevertheless need not be either partly or wholly taken off of the wheel when a change of rims is to be effected,—to provide permanent rim clamping and wedging devices so formed and protected by the rim as to prevent their being broken or sheared off when the wheel runs against a curb, and generally to provide an improved structure of this kind which shall be strong and substantial and yet be of little weight and low cost.

With these objects in view my invention consists in the improvements hereinafter described and particularly pointed out in the appended claims.

This application is a continuation of my earlier application Serial No. 566,605, filed June 13th, 1910, being substantially a division thereof, and embodies subject matter also previously shown but not claimed in my co-pending applications Serial No. 606,992, filed February 6th, 1911, and Serial No. 607,997, filed February 11th, 1911.

My invention will be more readily understood by reference to the appended drawings; in which—

Figure 1:
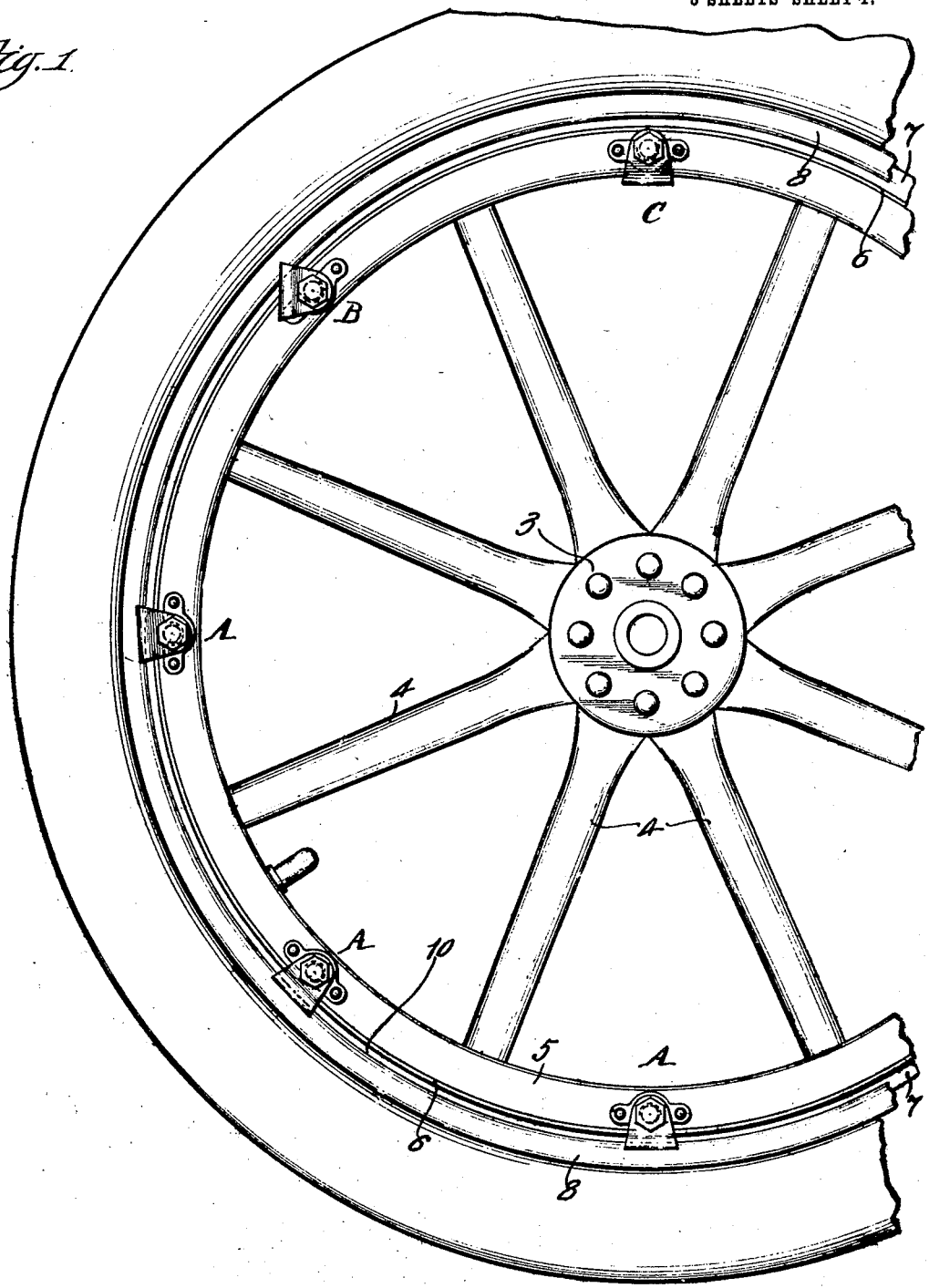
Figure 2:
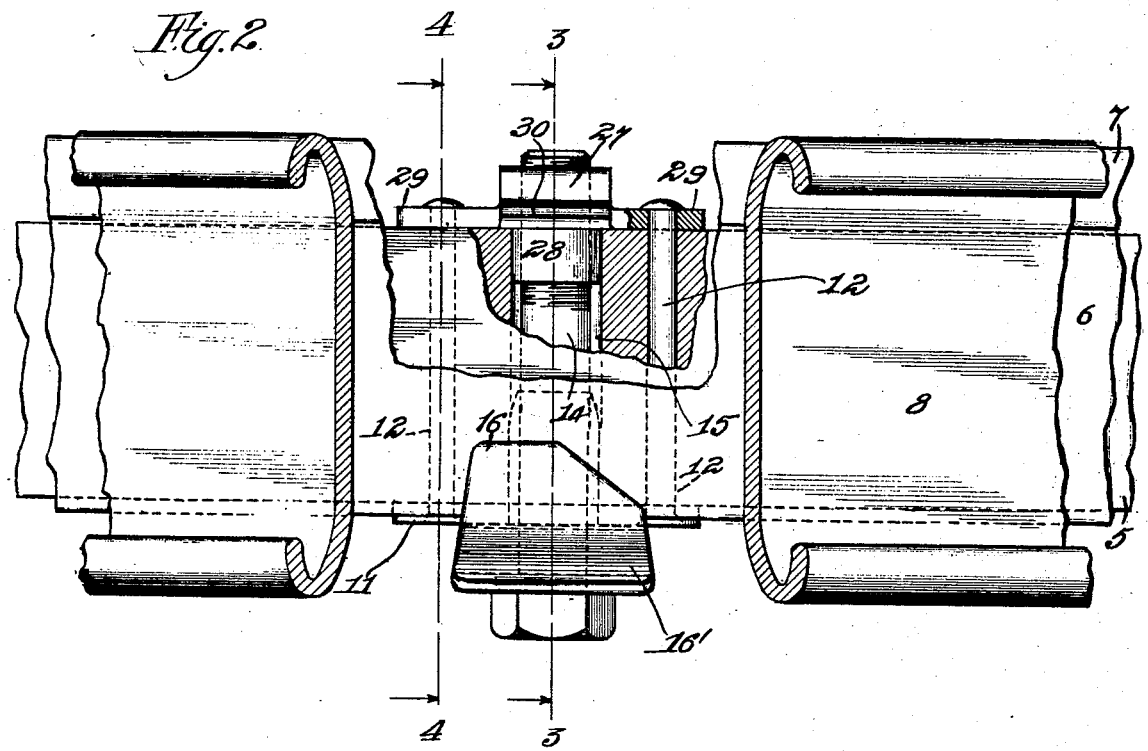
Figures 3, 4:
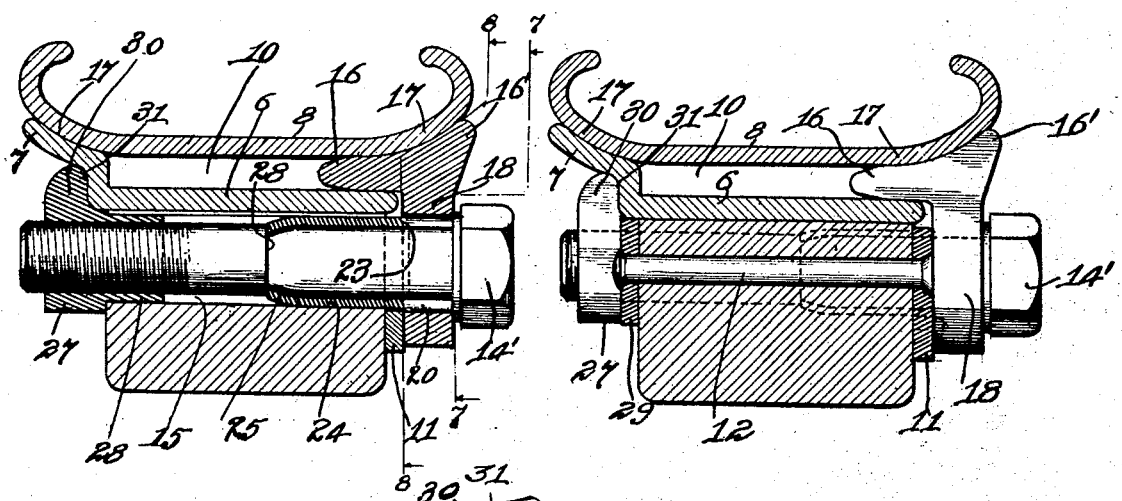
Figure 5:
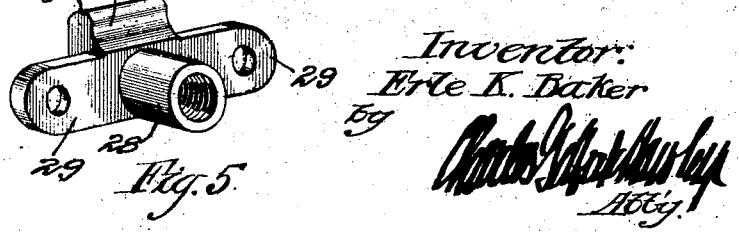

Figure 1 illustrates an automobile wheel rim and wedging and clamping devices embodying my invention; Fig. 2 is an enlarged view of a portion of the wheel with a complete clamping device; Fig. 3 is a sectional view on the line 3—3 of Fig. 2; Fig. 4 is a sectional view on the line 4—4 of Fig. 2; Fig. 5 is a perspective view of the combined stop or limiting block and threaded nut which forms part of my novel clamping device; Fig. 6 is a perspective view of the complete wedging and clamping device in assembled form, dissociated from the wheel; Fig. 7 is a sectional view on the irregular section line 7—7 of Fig. 3; and Fig. 8 is a sectional view on the irregular section line 8—8 of Fig. 3.

The automobile wheel, as shown in the drawings, comprises a hub 3, spokes 4, a felly 5 and the metal felly band 6. Ordinary rims 8 for pneumatic tires 9 are shown. On the inner side, meaning toward the body of the automobile, the felly band 6 has the usual inclined annular flange 7 to receive the inward thrust of the rim, limit its inward movement upon the wheel and help center it on the wheel.

As clearly shown in the drawings the rim 8 is larger than the felly band 6 and there is a gap or annular space 10 between the two in which the wedging and clamping lugs may work. There are several of these lugs. They are spaced around the wheel on the outer side thereof and together with the felly band flange 7 they serve to support, center and fix the rim upon the wheel.

In Fig. 1, the clamping wedge lugs at points marked A are represented as in working position. At point B such lug is shown in partly disengaged position, and at point C the lug is shown turned away from the rim to free the rim. The wedging and clamping devices are of the same construction throughout and a description of one will serve for all. In preferred form, each of these devices comprises three principal parts, to wit, a combined stop block and nut on the inner side of the wheel, a bolt long enough to pass through the wheel felly and screw in and out of the nut, and a clamping wedge lug loosely swiveled on the head end or outer end of the bolt and thereby movable in both directions as required to fasten and unfasten the rim on the wheel. With these parts are associated a face plate 11 and means which fasten the face plate and said nut to the felly of the wheel. In preferred form, the fastening means are rivets 12.

As best shown in Figs. 2 and 3 the clamping bolt 14 occupies a hole 15 in the felly 5 close to the felly band 6. The threaded nut for the bolt is fixed and fastened on the inner side of the wheel and extends into the hole 15. The bolt screws back and forth in the nut. The clamping wedge, indicated by the reference numerals 16—16', acts between the felly band and the rim and serves as a driver to force the rim upon the wheel. The wedge works against one flaring side 17 of the rim while the flange 7 of the felly band receives the other flaring side 17 of the rim. The inner end of the wedge is pointed so that it may easily enter the described space 10 between the rim and wheel. Once the end of the wedge is thus entered the wedge rides on the felly band and its movement is directly inward, the clamping effect being gained by the inclined top or outer surface of the wedge. The wedge is necessarily eccentric to the bolt and its resistance puts a heavy strain on the latter. As none of the parts can be very large it is most desirable that the relation between the wedge lug and operating device (the bolt) be such as to afford maximum strength, rigidity and durability. Once the wedges are driven inward or home by their bolts they very firmly hold the rim on the wheel and are themselves firmly held between the rim and the felly band. Therefore considerable force is required to withdraw them. I accomplish such withdrawal by means of the bolts and at the same time secure a maximum of strength in the device as a whole. As before said, the clamping wedge moves with the bolt in both directions. I attain this by providing the wedge with a right angled integral shank 18, in vertical position at the outer end of the wedge, and by swiveling this shank on the outer end of the bolt. The wedge 16—16' and shank 18 form what I term a wedge lug, the same in effect constituting a rim engaging lug on the wheel. As shown in Figs. 3 and 7 the bolt passes through a hole 20 in the wedge lug shank and this hole is elongated to allow the wedge to readily adjust itself to the felly band and rim. The head 14' of the bolt engages the outer side of the shank 18 to drive it inward. Another shoulder on the bolt acts to drive the wedge lug outward when the bolt is turned in the other direction. This shoulder may be variously located and formed on the bolt, but, preferably, and to retain the advantages of the slot 20 and cheapness of construction, I make the needed shoulder 23 by swaging a sleeve 24 onto the bolt with one end bearing against the inner side of the shank 18 of the wedge lug. To hold the sleeve on the bolt I form a groove 25 having a sharp shoulder 26 in the bolt and swage the other end of the sleeve down into this groove, as clearly shown in Fig. 3. Added to this function, the sleeve 24 serves to markedly strengthen the bolt where it receives the greatest bending strain from the wedge lug and also furnishes a large bearing close to the head of the bolt. The sleeve, or bolt enlargement, fits the hole 15 and overlaps the face plate 11, which therefore provides a metallic bearing for the bolt close up to the wedge lug. The combined stop block and nut comprises the block portion 27, the boss or sleeve portion 28 and the side wings 29, 29. The wings and integral block portion 27 fit against the felly and form a rear face plate. The part 28 fits the hole 15 and the thread extends through both the block and boss portions, as shown in Fig. 3. The block portion 27 has an extension or stop proper 30 which engages the felly band, its inner surface 31 being conformed to the edge of the felly band. This stop 30 strengthens the flange 7 and, primarily, holds the felly band on the felly against the displacing action of the bolt and wedge lug.

Referring now to Fig. 8 it will be seen that the fastenings of the rear face plate (block and nut), namely the rivets 12, extend through the felly and also fasten the front plate 11. For convenience in assembling the parts the plate 11 is provided with a U-shaped notch 32 which accommodates the bolt. The threads of the bolt and the nut are long enough to permit the bolt to be turned out to free the inner end or point of the wedge from the felly band without detaching the bolt. When the lug is thus freed it may be turned down out of the way to free the rim. To minimize the movement of the lug in freeing the rim I cut off or bevel one inner corner of the wedge lug, as clearly shown in Fig. 2. This novel formation of the wedge lug is not claimed in this application but is fully described and claimed in my co-pending companion application Serial No. 639,393, filed July 19th, 1911.

The improvements herein described provide for wedge lugs that are positively operable in both directions and generally provide a construction in which there are no loose or removable parts other than the rim itself whereas the general practice has been to take the nuts from the bolts and then remove the wedge lugs. By these improvements the operation of demounting and remounting a rim is rendered more convenient and quicker to carry out.

Having thus described my invention I claim as new and desire to secure by Letters Patent:—

1. A demountable-rim clamping device for automobile wheels characterized by a straight screw bolt having a head on its outer end, in combination with a wedge lug as described swiveled upon said bolt and held against said head for movement with the bolt in both directions.

2. A demountable-rim clamping device for automobile wheels characterized by a straight screw bolt having a head on its outer end, in combination with a wedge lug as described loosely swiveled upon said bolt for self adjustment as described and held against said head for movement with the bolt in both directions.

3. A demountable-rim clamping device for automobile wheels characterized by a straight screw bolt having a head on its outer end, in combination with a wedge lug as described swiveled upon said bolt and a sleeve fixed on said bolt and holding said lug against said head for movement with the bolt in both directions.

4. A demountable-rim clamping device for automobile wheels characterized by a straight screw bolt having a head on its outer end, in combination with a slotted wedge lug as described swiveled upon said bolt and a sleeve swaged on said bolt and holding said lug against said head for movement with the bolt in both directions.

5. A demountable-rim clamping device for automobile wheels characterized by a straight screw bolt having a head on its outer end, in combination with a wedge lug as described loosely swiveled upon said bolt for self adjustment as described, a combined bolt nut and felly band stop and means for fastening the same to a wheel felly.

6. A demountable-rim clamping device for automobile wheels characterized by a straight screw bolt having a head on its outer end, in combination with a combined bolt nut and felly band stop, means for fastening the same to a wheel felly and a wedge lug as described loosely swiveled upon said bolt for self adjustment as described, and held against said head for movement with the bolt in both directions.

7. A demountable-rim clamping device for automobile wheels characterized by a straight screw bolt having a head on its outer end, in combination with a combined bolt nut and felly band stop, a front face plate, rivets for binding said combined nut and stop and said plate to opposite sides of the wheel felly and a wedge lug as described loosely swiveled upon said bolt for self adjustment as described.

In witness whereof, I have hereunto set my hand, this 21st day of June, 1911, in the presence of two subscribing witnesses.

ERLE K. BAKER.

Witnesses:
  EDWARD F. WILSON,
  JOHN R. LEFEVRE.